United States Patent Office 3,412,592
Patented Nov. 26, 1968

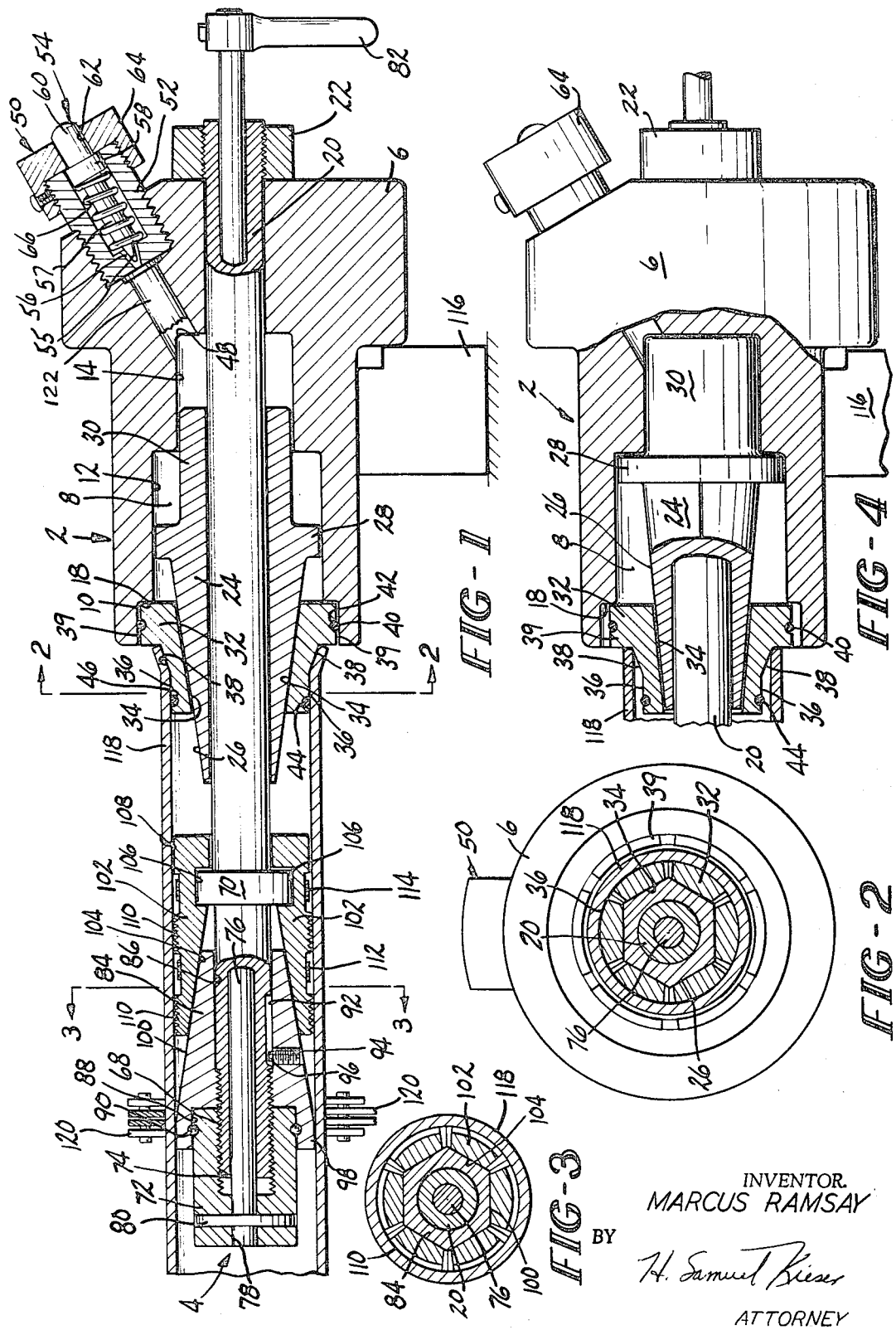

3,412,592
PIPE GRIPPING AND FLARING APPARATUS
Marcus Ramsay, New Haven, Conn., assignor to Olin Mathieson Chemical Corporation, a corporation of Virginia
Filed Oct. 22, 1965, Ser. No. 501,645
5 Claims. (Cl. 72—316)

ABSTRACT OF THE DISCLOSURE

An explosive-actuated pipe flaring apparatus having a housing for a tapered expander element. A plurality of flaring segments are disposed about said expanding element, each of the segments having an internal tapering surface in engagement with the tapering surface of the expanding element whereby when the expanding element is driven forward under the force of the gases generated by the explosive cartridge, the flaring segments are driven outwardly to flare the pipe.

This invention relates generally to an apparatus for gripping and flaring an elongate hollow metal article, and more particularly to a power-actuated flaring tool for flaring the end of a metal pipe and to a tool for gripping the internal surface of a pipe to prevent axial movement thereof.

In many industrial applications, it is necessary that the ends of welded steel tubing be flared. In addition to the manual operated devices that have been used to perform such an operation, various explosively-actuated flaring tools have been proposed which utilize a solid tapered die member that is propelled against the end of the pipe by the gases generated by the explosion of a cartridge.

However, with such arrangements the results are not always satisfactory because of the tendency for the pipe to split when the tapered die member is propelled at the velocity required to produce the particular flare dimension.

The explosively-actuated flaring tools of the type mentioned also required a tool, to be used in connection therewith, to prevent axial movement of the pipe with respect to the flaring tool during the flaring operation. As will readily be appreciated, the impact of the flaring die against the end of the pipe results in a relatively high force tending to rip the pipe from the device securing it.

Some gripping arrangements utilized jaw members which wrapped around the external surface of the pipe. These devices were usually large and unwieldly, and in many instances did not provide sufficient holding power. Other devices have been designed for gripping hollow objects which involve expanding rubber or other resilient material, against the internal surface of the article. These devices, while being less cumbersome than the jaw type devices, required a great deal of manual force to expand the rubber element into engagement with the hollow article so the connection was tight enough to provide the proper holding power. In addition, these devices suffered from the disadvantage that the rubber element would begin to fail by being abraded by the rough interior of the pipe during its insertion and removal.

It is therefore an object of this invention to provide an improved power tool for flaring the end of a hollow metal article.

It is yet another object of this invention to provide an improved tool for flaring the end of a pipe wherein the required force of the pipe forming element may be obtained without splitting the tube.

Another object of this invention is to provide an improved pipe flaring tool wherein the velocity of the pipe flaring element is reduced without a reduction in the energy output.

Still another object of the invention is to provide an improved gripping apparatus to prevent axial movement of a pipe.

A further object is to provide a tool for gripping a pipe wherein the tool acts upon the internal surface of the pipe.

Yet another object of this invention is the provision of a pipe gripping tool which is durable and can withstand repeated usage without losing its gripping power.

A more specific object of this invention is to provide a pipe flaring tool wherein a force applied upon the end of the pipe will tend to increase the gripping power between the tool and the pipe.

These and other objects of the present invention may be accomplished according to a preferred embodiment of this invention by the provision of a piston member having an outer tapered surface mounted within a housing for reciprocal movement therein. The outer surface of the piston defines, in cross section, a polygon. A segmented flaring member is disposed about the piston with each segment having a tapered inner surface corresponding to that portion of the outer surface of the piston member which defines one side of the polygon. The outer surface of each segment includes a tapered, arcuate portion and a second non-tapered portion that defines a segment of a cylinder.

The preferred embodiment of the pipe gripping means of this invention may include a segmented gripping member which is mounted about a rod member and which is restrained from axial movement. The segmented pipe gripping member includes an outer surface having pipe gripping means and an internal tapered surface. An expander member having an outer tapered surface is disposed within an in mating engagement with the segmented gripping member. Means may be provided to move the expander member relative to the segmented gripping member to expand the gripping member into internal surface with the pipe.

This invention may be more readily understood by reference to the following description of the preferred embodiment and to the accompanying drawings in which:

FIGURE 1 is a transverse sectional view of a pipe expander and gripping apparatus constructed in accordance with the present invention and shown after the pipe has been expanded;

FIGURE 2 is a cross sectional view taken along the lines 2—2 of FIGURE 1;

FIGURE 3 is a cross sectional view taken along the lines 3—3 of FIGURE 1, and

FIGURE 4 is a transverse sectional view of the pipe flaring assembly of the apparatus shown with the components positioned prior to the flaring operation.

Referring specifically to the drawing, FIGURE 1 shows an apparatus constructed in accordance with the present invention including a pipe flaring assembly 2 and a pipe gripping assembly 4.

The pipe flaring assembly 2 may include a housing 6 having an opening 8 extending into the forward end thereof. The opening includes a first counterbored portion 10, a second counterbored portion 12 and a third reduced portion 14. The bottom of the first counterbored portion 10 defines an abutment shoulder 18.

A hollow rod member 20 may extend through the housing and project from the forward end thereof. The rod member 20 may be prevented from forward axial movement with respect to the housing by provision of a nut member 22.

An expander member 24 may be positioned within the opening 8 in the housing 6 and may be disposed about the rod member 20 and be adapted to move reciprocally thereon. The outer surface of the expander 24 may include a first portion 26 which tapers to its smallest dimension in a direction away from the housing 6.

As can be seen in FIGURE 2, the tapered portion 26 of the outer surface of the expander 24, in cross section, defines a polygon. In the preferred form of the invention this polygon is a regular hexagon having six sides of equal length resulting in the tapered portion 26 being comprised of six planar surfaces.

Immediately rearward of the first tapered portion 26 is a circular flanged portion 28 which has an external diameter substantially the same as the second counterbored portion 12 of the housing 6. A third circular portion 30 extends rearwardly from the circular flanged portion 28 and has a diameter substantially equal to the diameter of the third reduced portion 14 of the housing 6.

A segmented flaring member 32 is disposed about the first tapered portion 26 of the expander 24. Each segment of the flaring member 32 has an internal tapering surface 34 which corresponds to that portion of the tapered outer surface 26 of the expander 24 which defines one side of the hexagon. Accordingly, there are six such segments spaced about the expander 24.

The outer surface of each segment of the flaring member 32 includes a first arcuate portion 36 which defines a segment of a cylinder, a second portion 38 that tapers in a longitudinal direction and is arcuate in cross section, and a third flanged portion 39 which is arcuate in cross section.

In the firing position of a tool shown in FIGURE 4, the segments of the expander 24 have their edge portions in engagement with the corresponding edge portion of an adjacent segment. In such position, the first portion 36 of the outer surface forms a cylinder while the second, tapering, surface 38 defines a frustum of a cone.

A garter spring 40 or other suitable resilient member, may be positioned in a groove 42 in the outer surface of the flange 39 of each segment of the pipe flaring member 32 and extend circumfentially thereabout.

A garter spring 44 or other suitable resilient member may also be positioned in a groove 46 in the first arcuate portion 36 of each segment of the pipe flaring member and extend circumferentially thereabout. The springs 40 and 44 tend to bias the segments of the pipe flaring member 32 radially inwardly into a position wherein the edges of adjacent segments are in contact.

A cartridge chamber 48 is provided in the housing 6 in the rearward end thereof. A firing mechanism 50 communicates with the cartridge chamber 48, and includes a firing pin housing 52 threadedly secured to the housing 6. Mounted within the firing pin housing 52 is a firing pin 54 which includes a conical nose portion 55 adapted to be projected through a frusto-conical opening 56 in the firing housing 52, a body portion 57 having a flange 58 thereon, and a rearwardly extending projection 60 which extends through an opening 62 in a cap member 64. The cap member 64 may be threadedly secured to the firing pin housing 52. A suitable spring member 66 is mounted about the body portion 57 of the firing pin 54 and extends from the flange portion 58 to the forward portion of the firing pin housing 52 and biases the firing pin 54 away from its fired position.

The hollow rod member 20, as mentioned before, extends forward from the housing 6 and, as can be seen in FIGURE 1, terminates in an externally threaded portion 68. A circular flange 70 extends about the rod member 20 at a point outside of the housing 6. Threadedly secured to the end of the road member 20 is a driving member 72 which has a threaded counterbore 74 to which the hollow rod member 20 is connected.

A solid rod member 76 extends completely through the hollow rod member 20 and is of such diameter that it is easily rotatable therein. One end of the second rod member 76 extends into a reduced bore 78 in the driving member 72. A pin member 80 extends through both the driving member 72 and the solid rod member 76 in a direction perpendicular to the solid rod member 76 to provide a driving connection between the two members. A suitable lever 82 may be provided at the other end of the rod member 76 to facilitate the rotation of the solid rod member 76 in the hollow rod member 20.

An expander element 84 is mounted about the rod member 20 and driving member 72. As can be seen, the expander element 84 includes a cylindrical bore 86 through which the hollow rod member 20 extends and a circular counterbore 88 which overlaps the driving member 72. Ball members 90 may be interpositioned between the counterbore 88 of the expander element 84 and the outer cylindrical surface of the driving member 72 to facilitate the relative rotation thereof.

The hollow rod member 20 may be provided with a slot 92 extending axially therein. A screw member 94 is threadedly secured to the expander element 84 and includes a portion 96 extending into the slot in the hollow rod member 20 to prevent relative rotation between the hollow rod member 20 and the expander element 84.

The outer surface of the expander element 84 includes a first cylindrical portion 98 which has a diameter substantially equal to the inside diameter of the pipe and a second tapering portion 100 which tapers to its smallest dimension in a direction toward the housing 6 of the pipe flaring assembly 2. The tapered portion 100 of the outer surface of the expander element 84 is formed by a plurality of planar surfaces which, in cross section, form the sides of a polygon. In the preferred embodiment of this invention there are six such surfaces which, in cross section, form a regular hexagon, as seen particularly in FIGURE 3.

A segmented pipe gripping member 102 is disposed about the hollow rod member 20 and the expanded element 84. Each segment of the pipe gripping member 102 includes a first tapered planar internal surface 104 which overlaps one of the outer planar surfaces of the expander element 84.

Intermediate the ends of each segment of the pipe gripping member 102 is a transversely extending groove 106 having an arcuate bottom surface. The groove 106 accommodates the circumferentially extending flange 70 of the hollow rod member 20 which prevents axial movement of the segmented pipe gripping member 102. The width of the groove 106 in each segment is slightly greater than the width of the flange 70.

The outer surface 108 of the pipe gripping member 102 includes a plurality of pipe gripping projections 110 which have a generally arcuate configuration corresponding to an arc of a circle having a diameter equal to the internal diameter of the pipe to be gripped. Each of the pipe gripping projections 110 is provided with knurls or other suitable teeth-like projections to enhance the gripping properties of the pipe gripping member 102.

Resilient band members 112 and 114 may extend around the outer surface of the pipe gripping member 102. As seen in FIGURE 1, the band members 112 and 114 are positioned between the pipe gripping projections 110. Due the the resiliency of the band members 112 and 114, such members tend to bias the segments of the pipe gripping member 110 radially inwardly and into engagement with the circular flange 70 on the hollow rod member 20.

In operation, the apparatus of this invention may be placed on a conventional V-rest 116. The end of the pipe 118, which is to be flared, is slipped over the pipe gripping assembly 4 until its end abuts the front of the flange portion 39 of the flaring member 32. A conventional chain vise 120 may be used to further secure the apparatus.

As shown in FIGURE 4, in the firing position of the tool, the expander member 24 is positioned with its circular flanged portion 28 against the shoulder defined by the second counterbore 12 in the housing 6. In such position the edges of adjacent segments of the flaring member 32 are in engagement with each other. The outer surface of the flange portion 39 of each segment is spaced from the wall of the first counterbore 10 although the rearward faces of the expander elements are still in engagement with the first abutment shoulder 18.

The pipe gripping assembly 4 may then be tightened to positively secure the pipe 118 to the pipe flaring assembly 2 and to prevent axial movement of the pipe upon impact of the flaring member 32. This is accomplished by rotating the solid rod member 76 by means of its associated lever 82. Rotation of the solid rod member 76 in the proper direction will tend to thread the driving member 72 on the hollow rod member 20.

Since the hollow rod member 20 is prevented from forward axial movement, this threading action will tend to move the driving member 72 axially toward the housing 6 of the pipe flaring assembly 2. Since the driving member 72 abuts the expander element 84, the expander element 84 will also move toward the housing 6 and thereby expand the individual segments of the pipe gripping member 102 into engagement with the internal surface of the pipe 118.

After the pipe 118 is secured to the apparatus, and a cartridge 122 inserted in the cartridge chamber 48, the firing mechanism may be actuated by tapping the firing pin with a suitable implement to explode the cartridge. The forces of the gas generated by the explosion of the cartridge will propel the expander member 24 away from the housing such that the tapered outer surface 26 thereof will drive the individual segments of the flaring member 32 radialy outwardly. In so doing, the tapered portion 38 of the flaring member 32 will flare the end of the pipe.

One particular advantage of the present arrangement is that the high velocity of the expander member 24 is not transmitted directly to the pipe, but is reduced through the provision of the tapered surfaces on the expander element 24 and flaring member 32. It has been found extremely effective to reduce the velocity by a factor of three. Such reduction may be accomplished by utilizing a slope of 1:3 in tapering the outer surface of the expander member and the inner surface of the flaring member 32.

Yet another advantage of this invention is the fact that any movement of the pipe due to the impact during the flaring operation will tend to drive the segments of the pipe gripping member 102 up the tapered surface 100 of the expander member 84 and thereby enhance the gripping action between the pipe and the pipe gripping member.

While reference has been made above to a particular embodiment of this invention, various alterations and modifications will readily suggest themselves to those skilled in the art. Accordingly, the scope of this invention should be ascertained by reference to the following claims.

What is claimed is:

1. An explosive-actuated apparatus for flaring the end of a tubular member comprising a housing having a bore therein, a cartridge receiving chamber in said housing and communicating with said bore, expander means mounted within said bore for reciprocal movement, said expander means having an outer surface tapering in a longitudinal direction, flaring means including a plurality of segmets disposed about said expander means, each of said segments having an inner tapering surface in engagement with the tapering surface of said expander means and an external surface including a forward transversely arcuate surface portion, an intermediate transversely arcuate and longitudinally tapering surface portion, and a rearward outwardly extending flange portion having a forward face, a counterbore in the forward end of said housing, said flange portion being received in said counterbore in the forward end of said housing, and means for holding the end of the tube against the forward surface of the flange portion of said flaring means prior to and during the flaring operation.

2. The apparatus of claim 1 wherein the outer surface of said expander means includes a plurality of longitudinally extending planar portions, and the inner tapering surface of each of said flaring means is planar in a longitudinal direction and is in engagement with one of the planar portions of said expander means.

3. The apparatus of claim 2 wherein the tapering outer surface of said expander means and the internal longitudinally tapering planar surface of each segment have a slope of 1:3.

4. The apparatus of claim 2 wherein the planar portions of the outer surface of the expander means dtfine a regular hexagon in cross section and wherein the flaring means comprises six segments.

5. The apparatus of claim 4 further including rod means extending through the bore of said housing and wherein said expander means is mounted on said rod means and said flaring means includes means for biasing said segments radially inwardly.

References Cited

UNITED STATES PATENTS

| 1,651,231 | 11/1927 | Shrum | 72—355 |
| 2,158,312 | 5/1939 | Terrell | 72—355 |
| 2,303,061 | 11/1942 | Parker | 72—316 |
| 2,352,912 | 7/1944 | Parker | 72—355 X |
| 2,557,722 | 6/1951 | Brauchler | 72—355 |
| 2,579,919 | 12/1951 | Funke | 72—399 |
| 3,056,197 | 10/1962 | Lawson | 72—370 X |

FOREIGN REFERENCES

| 317,748 | 8/1921 | Great Britain. |

CHARLES W. LANHAM, *Primary Examiner.*

E. SUTTON, *Assistant Examiner.*